Nov. 8, 1949  M. E. GLUHAREFF  2,487,646
RUBBER MOUNTED TAIL ROTOR
Filed May 7, 1947
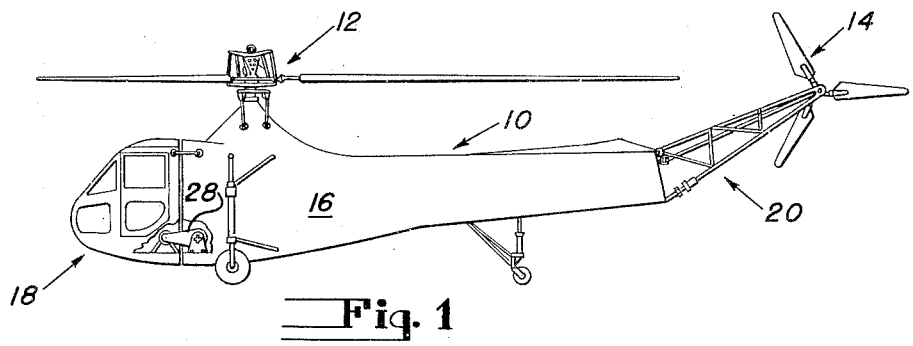
Fig. 1
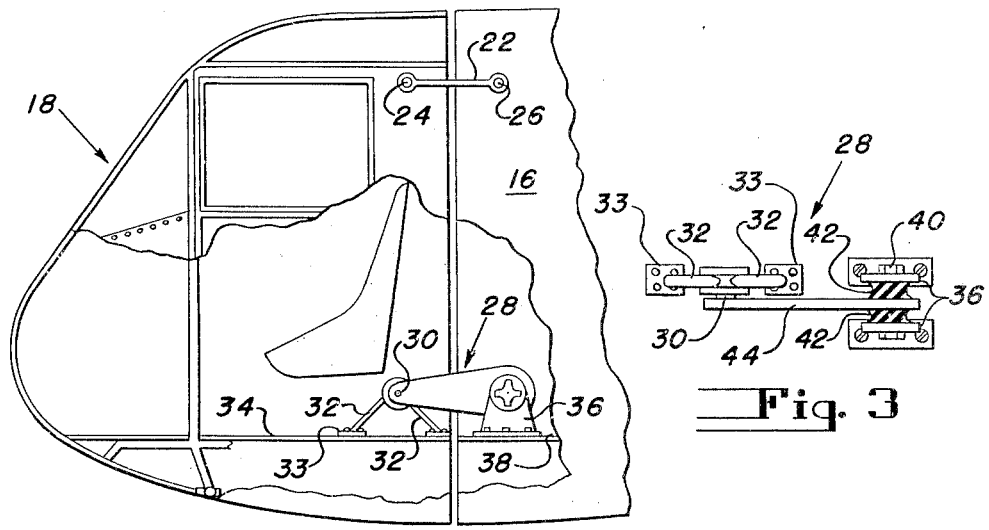
Fig. 2
Fig. 3
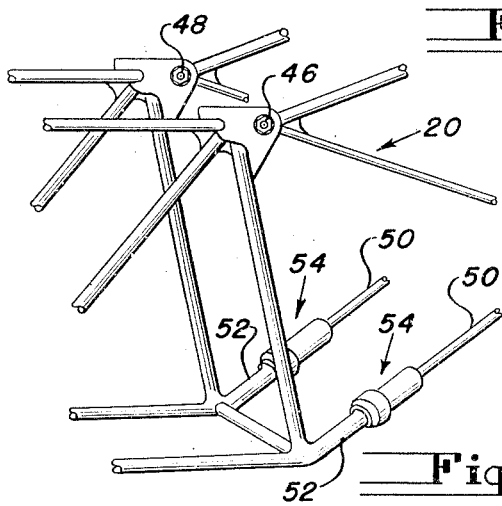
Fig. 4
Fig. 5
M. E. GLUHAREFF
INVENTOR
BY Charles L. Shelton
ATTORNEY Patented Nov. 8, 1949

2,487,646

UNITED STATES PATENT OFFICE 2,487,646

RUBBER MOUNTED TAIL ROTOR

Michael E. Gluhareff, Bridgeport, Conn., assignor to United Aircraft Corporation, East Hartford, Conn., a corporation of Delaware Application May 7, 1947, Serial No. 746,545

7 Claims. (Cl. 244—17.11)

This invention relates to vibration problems found in helicopters and particularly to novel mounting means for the component parts of the helicopter body whereby the induced vibrations are isolated, resulting in increased passenger comfort.

Accordingly, an object of this invention is to provide means for damping transient vibrations in the fuselage of a helicopter.

Another object is to mount sections of a helicopter body so that vibrations in one portion are not transmitted to another but are damped by rubber stressed in shear.

A further object is to provide rubber mountings for the component parts of a helicopter body.

Another object is to provide vibration damping means between the various portions of a helicopter body.

Another object is to provide flexible suspension for the helicopter body portions.

A further object is to provide a helicopter having a pilot's compartment which is relatively free of vibrations.

Other and further objects will be either obvious or pointed out in the following specification and claims:

In the drawings:

Fig. 1 is a side elevation view of a helicopter with parts removed to show the flexible suspension of the cabin and tail cone.

Fig. 2 is a side elevation of the cabin and part of the central portion to show the cabin suspension in greater detail.

Fig. 3 is a top view of the rubber cabin mount shown in Fig. 2.

Fig. 4 is a fragmentary perspective view showing the flexible mounting for the tail assembly.

Fig. 5 is a cross sectional view of the shock mount shown in Fig. 4.

Referring to the drawings in detail, Fig. 1 shows a helicopter 10 having a main sustaining and propelling rotor 12 and a torque counteracting tail rotor 14. The body of the helicopter is comprised of a main central portion 16 which houses the engine and the landing gear, the cabin 18 and a tail cone 20. The cabin and the tail cone are flexibly supported on the central portion 16 by means of rubber stressed in shear. This mounting will isolate the vibrations induced in the component body parts and will materially reduce the vibrations felt in the cabin, thus reducing pilot fatigue and increasing comfort.

The vibrations induced in the central part 16 of the helicopter 10 arise from several sources. For example, leaky dampers or dampers having unequal rates will cause a vibration at one-third the main rotor speed. Another cause of vibrations is improper balance and tracking of the main rotor blades which will produce a vibration at main rotor speed. The most common source of vibrations in the central part 16 is variation of the spanwise center of pressure in the three main rotor blades. This causes vertical vibrations at 3 times main rotor speed. Another vibration at the same frequency is caused by the Coriolis effect due to the inclination of the virtual axis of rotation with respect to the real axis of rotation. In a helicopter the air flow is generally down through the disk while in auto-rotation the air flow is generally upward. During an approach and some conditions of take-off the flow becomes mixed and induces vibrations of approximately three times main rotor speed.

By suspending the cabin on a flexible vibration damping support these induced vibrations are confined to the central portion of the helicopter. It should be understood that various corrective measures can be taken to reduce the amplitude of these vibrations but due to the delicate nature of the adjustments it is extremely difficult to reduce the vibrations to negligible degree.

As may be seen more clearly in Fig. 2, the cabin is supported at two points. At the upper portion of the cabin a link 22 is pivoted at 24 on the cabin and at 26 on the central part 16 of the body. These pivots permit free movement of the link. The lower part of the cabin is flexibly mounted to absorb vibrations by means of a shock absorber generally denoted by the numeral 28. Since the primary source of vibrations is the main rotor 12 the cabin portion 18 should be designed to have, when loaded, a mass weight equal to that of the main rotor to attain the highest mounting efficacy.

Referring to Figs. 2 and 3, the construction of the shock absorber 28 may be readily seen. A pivot 30 is rigidly supported by means of members 32, 32 having integral plates 33, 33 which are bolted to the deck plate 34 in the cabin portion 18. In the central portion 16 of the helicopter body two upwardly projecting flanges 36, 36 are bolted to the deck plate 38 and have a bolt 40 passing therebetween. An arm 44 is loosely pivoted upon the bolt 40 to permit relative motion between the arm 44 and the bolt 40. Annular pieces of rubber 42, 42 are bonded to the flanges 36 and to the arm 44 and are preloaded in torsion when the arm 44 is connected to the pin 30. This preloading of the rubber in torsion must be sufficient to carry the weight of the cabin portion 18 on the pin 30.

When the helicopter is at rest, the cabin portion is carried primarily by the rubber 42 which is stressed in torsion. However, when the helicopter is in flight the vibrations induced in the central portion 16 cause relative movement between the cabin 18 and the central portion 16 so that the rubber 42 is stressed in shear and torsion, damping the vibrations.

The vibrations induced in the tail rotor arise from several conditions. Since the tail rotor revolves at high speed the balance is very delicate and any variation in the weights of the blades and the component parts will cause a vibration of approximately 1200 engine R. P. M. This vibration may also be felt at other engine R. P. M., dependent upon the degree of unbalance. Another source of vibrations is the Coriolis effect found when a large degree of coning exists during a sharp turn either to the left or the right. Sharp turns also produce additional vibrations when full rudder is utilized, since the blades strike the blade stop. The latter vibrations are not felt during normal sharp turns but only on full rudder turns.

By mounting the tail cone 20 on the flexible support, the vibrations induced in the tail cone are isolated from the rest of the body and also the tail cone will not receive vibrations from the central part 16 of the fuselage.

As may be seen in Fig. 4, the tail cone 20 is pivotally supported at 46, 48 on the upper portion of the main body structure. The lower struts 50, 50 are connected to the struts 52, 52 on the central portion by means of shock absorbers denoted by the numeral 54. These shock absorbers provide a convenient mount which will stress rubber in shear.

As may be seen in Fig. 5, which shows the details of the shock absorber, the struts 52 on the central part of the helicopter have a reduced diameter section 56. At the outer end of the reduced portion 56 is a flange 58 which acts as a stop in a manner to be more fully described hereinafter. The strut 50 on the tail cone 20 has an enlarged section 60 which fits over the flange 58 and the reduced section 56 on the strut 52. Bonded to the inner surface of section 60 and the outer surface of the reduced section 56 is an annular section of rubber 62. It will be apparent that relative movement between the struts 50 and 52 will place the rubber 62 in shear thus damping transient vibrations. Stops 64 and 66 are mounted on the enlarged portion 60 and cooperate with the flange 68 on struts 52 and the flange 58 on strut 52, respectively, to limit the relative movement between the struts 50, 52.

By means of the flexible suspension each of the three major parts of the body have been effectively isolated from vibrations in the other body sections. It will be obvious that other damping means could be utilized without departing from the spirit of my invention. Therefore, I wish not to be limited to the forms shown and described but by the scope of the following claims.

I claim:

1. Vibration damping means for isolating vibrations originating in the driving and propelling mechanism of rotary wing aircraft of the type having a body including a central portion supporting the driving motor and the sustaining rotor, a separate forward portion comprising the cabin and a separate tail portion aft of said central portion carrying a tail rotor, said damping means including upper and lower supports for connecting each of said fore and aft portions to said central portion, said upper supports comprising pivots providing freedom for relative movement between said portions about substantially horizontal pivotal axes, and said lower supports constituting cooperating elements carried by said adjacent body portions and connected by shear-stressed rubber-like material stressed in shear by the weight of said supported portions.

2. In a rotary wing aircraft having a body including a central portion containing the power plant, a separate forward portion comprising the cabin and a separate tail portion aft of said central portion, means for supporting said fore and aft portions on said central portion and isolating them from vibrations originating in said central portion comprising, upper and lower supports for connecting each of said fore and aft portions on said central portion, said upper supports comprising rigid pivoted members carried by the connected portions providing freedom for relative movement between said connected portions and said central portion about substantially horizontal pivotal axes, and said lower supports comprising cooperated pivoted elements carried by adjacent body portions and connected to one of said portions by shear-stressed rubber-like material which resists the weight of the fore and aft connected portions in shear of said material.

3. In a rotary wing aircraft having a body including a central portion containing the power plant and a separate forward portion comprising the cabin, means for supporting said forward portion on said central portion and isolating said cabin from vibrations originating in said central portion comprising, upper and lower supports connecting said portions, said upper support comprising rigid pivotally connected members carried by said body portions providing freedom for relative movement therebetween, and said lower support comprising rigid pivotally connected members mounted on said body portions, one of said members having a resilient pivotal connection with one of said connected body portions including a mass of rubber-like material placed under torsional stress by the weight of said forward portion.

4. In a rotary wing aircraft having a body including a central portion containing the power plant and a separate forward portion comprising the cabin, means for supporting said forward portion on said central portion and isolating said cabin from vibrations originating in said central portion comprising, upper and lower supports connecting said portions, said upper support comprising rigid pivotally connected members carried by said portions providing freedom for relative movement between said portions, and said lower support comprising a link having a pivotal connection to said forward portion at one end and a resilient pivotal connection to said central portion at its other end, said latter connection including a mass of rubber-like material bonded to said central portion and to said link at said pivot.

5. In a rotary wing aircraft having a body including a central portion containing the power plant and a separate forward portion comprising the cabin, means for supporting said forward portion on said central portion and isolating the cabin from vibrations originating in the latter portion comprising, upper and lower supports pivotally connecting said portions and providing freedom for relative movement therebetween, said upper and lower supports comprising rigid generally horizontal links having pivotal connections at their corresponding ends with said connected portions, the links comprising said lower supports having a resilient pivotal connection with one of said connected body portions including a mass of rubber-like material maintained under torsional stress by the weight of said forward portion.

6. In a rotary wing aircraft having a body including a central portion housing the driving mechanism and a forward portion comprising the cabin, upper and lower transverse supporting members pivotally connecting said portions, and means in the pivotal connection of certain of said members with said central portion for resiliently supporting said forward portion including a rubber-like mass of material stressed in torsion by the weight of said forward portion.

7. In a rotary wing aircraft having a body including a central portion and a separate tail portion aft of said central portion carrying a tail rotor, and means for mounting said tail portion on said central portion including upper and lower supports, said upper supports comprising pivotally connected members carried by said connected portions and said lower supports comprising spaced telescoping members carried by said portions and a rubber-like mass stressed in shear by the weight of said tail portion occupying said space and bonded to said respective members.

MICHAEL E. GLUHAREFF.

REFERENCES CITED

The following references are of record in the file of this patent:

UNITED STATES PATENTS

| Number | Name | Date |
| --- | --- | --- |
| 1,340,154 | Carns | May 18, 1920 |
| 1,623,865 | Doncheff | Apr. 5, 1927 |
| 1,853,991 | Olesen | Apr. 12, 1932 |
| 2,028,549 | Lord | June 21, 1936 |
| 2,395,143 | Prewitt | Feb. 19, 1946 |
| 2,432,441 | Pecker et al. | Dec. 9, 1947 |